United States Patent
Danielsson et al.

(10) Patent No.: US 10,191,162 B2
(45) Date of Patent: Jan. 29, 2019

(54) RADIATION HARD SILICON DETECTORS FOR X-RAY IMAGING

(71) Applicant: Prismatic Sensors AB, Stockholm (SE)

(72) Inventors: Mats Danielsson, Taby (SE); Staffan Karlsson, Bromma (SE); Cheng Xu, Taby (SE); Martin Sjolin, Stockholm (SE)

(73) Assignee: PRISMATIC SENSORS AB, Stockholm (SE)

( * ) Notice: Subject to any disclaimer, the term of this patent is extended or adjusted under 35 U.S.C. 154(b) by 0 days.

(21) Appl. No.: 15/588,030

(22) Filed: May 5, 2017

(65) Prior Publication Data

US 2018/0321394 A1    Nov. 8, 2018

(51) Int. Cl.
   *G01T 1/24*   (2006.01)
   *G21K 1/02*   (2006.01)

(52) U.S. Cl.
   CPC .............. *G01T 1/241* (2013.01); *G21K 1/02* (2013.01)

(58) Field of Classification Search
   CPC .................................. G01T 1/241; G21K 1/02
   See application file for complete search history.

(56) References Cited

U.S. PATENT DOCUMENTS

| 4,686,417 | A | * | 8/1987 | Noji | ...................... H01J 29/867 250/515.1 |
| 5,144,141 | A | | 9/1992 | Rougeot et al. | |
| 5,378,894 | A | | 1/1995 | Akai | |
| 5,712,483 | A | | 1/1998 | Boone et al. | |
| 8,183,535 | B2 | | 5/2012 | Danielsson et al. | |
| 2004/0251419 | A1 | | 12/2004 | Nelson et al. | |
| 2006/0227930 | A1 | | 10/2006 | Mattson et al. | |

(Continued)

FOREIGN PATENT DOCUMENTS

| EP | 1 408 347 A1 | 4/2004 |
| WO | 2010093314 A1 | 8/2010 |
| WO | 2017052443 A1 | 3/2017 |
| WO | 2017/070961 A1 | 5/2017 |

OTHER PUBLICATIONS

Jiaguo Zhang, X-Ray Radiation Damage Studies and Design of a Silicon Pixel Sensor for Science at the XFEL, Doctoral Thesis, Hamburg University, 2013, pp. i-193.

(Continued)

*Primary Examiner* — Hugh H Maupin
(74) *Attorney, Agent, or Firm* — Young & Thompson (57) ABSTRACT

Disclosed is a detector system for x-ray imaging. The detector system includes a detector having a plurality of edge-on detector modules. Each of the edge-on detector modules includes a first edge that is adapted to be oriented towards an x-ray source and a front-side running essentially parallel to the direction of incoming x-rays. The front-side includes at least one charge collecting electrode. At least a subset of the plurality of edge-on detector modules being pairwise arranged, front-side to front-side, whereby a front-side to front-side gap is defined between the front-sides of the pairwise arranged edge-on detector modules. The pairwise arranged edge-on detector modules are associated with an anti-scatter collimator arranged in the x-ray path between the x-ray source and the edge-on detector modules and overlapping the front-side to front-side gap.

17 Claims, 8 Drawing Sheets

(56) References Cited

U.S. PATENT DOCUMENTS

| | | | |
|---|---|---|---|
| 2011/0122998 A1* | 5/2011 | Proksa | G01T 1/2928 378/154 |
| 2013/0249030 A1* | 9/2013 | Takahashi | H01L 31/118 257/429 |
| 2014/0355734 A1* | 12/2014 | Ying | A61B 6/032 378/7 |
| 2015/0324973 A1 | 11/2015 | Ueki et al. | |
| 2017/0265822 A1* | 9/2017 | Du | A61B 6/03 |

OTHER PUBLICATIONS

Xuejin Liu, et al., Spectral response model for a multibin photon-counting spectral computed tomography detector and its applications, Journal of Medical Imaging, Jul.-Sep. 2015, pp. 033502-1-033502-11, vol. 2, No. 3.

Cheng Xu, et al., Energy resolution of a segmented silicon strip detector for photon-counting spectral CT, Nuclear Instruments and Methods in Physics Research A, 2013, pp. 11-17, vol. 715, Elsevier B.V.

Mats Danielsson, et al., Dose-efficient system for digital mammography, Medical Imaging 2000: Physics of Medical Imaging, 2000, pp. 239-249, Proceedings of SPIE, vol. 3977.

Jörn Schwandt, Design of a Radiation Hard Silicon Pixel Sensor for X-ray Science, Doctoral Thesis, Hamburg University, 2014, pp. II-xiii.

Written Opinion issued in Application No. PCT/SE2018/050420, dated Jul. 26, 2018.

International Search Report issued in Application No. PCT/SE2018/050420, dated Jul. 26, 2018.

* cited by examiner

Fig. 8

RADIATION HARD SILICON DETECTORS FOR X-RAY IMAGING

TECHNICAL FIELD

The present invention relates generally to a detector system for x-ray imaging and more particular to a detector system provided with edge-on detector modules.

TECHNICAL BACKGROUND

Among the semi-conductor material that may be used a detector materials silicon has many advantages such as high purity and low energy required for creation of charge carriers and also high mobility of charge carriers, all of which makes silicon predominating in the available semi-conductor materials used primarily for radiation detectors. By implanting heavily doped layers as electrical contacts on top of low doping silicon and by applying a reverse bias to the junction to make the detector fully depleted, the radiation created charge carriers electron-hole pairs can be collected by the corresponding charge collecting electrodes.

There has been a considerable interest in silicon as the material for photon-counting detectors in particular for medical imaging. By far most detectors operate in an integrating mode in the sense that they integrate the signal from a multitude of x-rays and this signal is only later digitized to retrieve a best guess for the number of incident x-rays in a pixel. The last years so called photon counting detectors have emerged as a feasible alternative in some applications and commercially available mainly in mammography. The photon counting detectors have an advantage since in principal the energy of each interacting x-ray can be measured which yields additional information about the composition of the object, leading to improved image quality and/or a decrease in radiation dose.

Silicon has been used successfully in applications with lower energy as is for example outlined by M. Danielsson, et al., "Dose-efficient system for digital mammography", Proc. SPIE, Physics of Medical Imaging, vol. 3977, pp. 239-249 San Diego, 2000. The main challenge with silicon is its low atomic number and low density which means it has to be made very thick for higher energies to be an efficient absorber. The low atomic number also means the fraction of Compton scattered x-ray photons in the detector will dominate over the Photo absorbed photons which will create problem with the scattered photons since they may induce signals in other pixels in the detector which will be equivalent to noise in those pixels.

There has been a continuous effort on evaluating the feasibility of employing silicon for high energy applications, such as computed tomography, as described in U.S. Pat. No. 8,183,535 B2 Mats Danielsson et al. "Silicon detector assembly for x-ray imaging", Cheng Xu et al.: "Energy resolution of a segmented silicon strip detector for photon-counting spectral CT" Nuclear Instruments and Methods in Physics Research 715201311-17 and Xuejin Liu et al.: "Spectral response model for a multibin photon-counting spectral computed tomography detector and its applications" Journal of Medical Imaging 23 2015 033502. An edge-on configuration of the silicon detector is described, with which the detection efficiency of silicon is increased significantly. Thin anti-scatter foil of a high Z element is attached to substrate to stop the scattered photons as a result of Compton scattering from reaching other silicon substrates.

Detectors having detector modules provided with collimators are illustrated in US2004/0251419 A1, Nelson et al. There it is shown how each detector in a strip detector is provide with a collimator. Adjacent strip detectors are separated by an air-gap.

Performance degradation from radiation-induced damages is a problem for any semi-conductor detectors. The relevant study on silicon has been carried out for decades. Particles traversing a silicon detector may interact with the material leading to ionizing or non-ionizing energy deposition. In both cases damage to silicon detector is possible. There are two types of radiation damages in silicon detectors, bulk damage and surface damage. The bulk damage due to the non-ionizing energy loss of incident particles is hard to happen for energy less than around 300 keV, whereas the surface damage causes most of the problems for silicon detectors used in the energy range of x-ray imaging from 40 keV to 250 keV. The surface damage is mainly introduced by the ionizing energy loss of charged particles or x-ray photons, which leads to the build-up of positive charges and traps in silicon dioxide and at the interface between silicon and silicon dioxide.

The success of silicon detectors using the planar processes relies strongly on the possibility to passivate the front-side surface with an oxide layer. Most often a silicon dioxide layer is grown thermally on silicon substrate by exposing silicon to an oxidizing ambient at elevated temperatures. When an x-ray interacts with a silicon detector, a cloud of charge carriers is released. The charge carriers created within silicon can be collected by charge collecting electrodes under an applied electric field, but those created within the silicon dioxide layer are trapped at the interface between silicon and silicon dioxide. Within several nanometer from the interface between silicon and silicon dioxide, the region is highly disordered, where the deep level defects are located. The deep level defects in silicon dioxide can trap holes and form fixed and positive oxide charges, which would cause some problems of the detector. There are some other kinds of defects in silicon dioxide and at the interface between silicon and silicon dioxide, discussed by Jiaguo Zhang: X-ray radiation damage studies and design of a silicon pixel sensor for science at the XFEL, and Jörn Schwandt: Design of a radiation hard silicon pixel sensor for x-ray science.

The defects induced by radiation impact electrical properties and mainly cause the following performance degradation of silicon detectors: increase of leakage current, increase of depletion voltage, increase of capacitance, formation of electron accumulation layer, decrease of breakdown voltage and charge loss near the interface between silicon and silicon dioxide. The electron-accumulation layer is relevant to the change of electrical properties of silicon detectors, and prevents the full depletion of a detector at the surface. The charge collection efficiency would also be affected by the electron-accumulation layer in the volume near the front-side surface of a detector. Consequently, there is a need in the art for semi-conducting detectors, in particular silicon detectors, which are less sensitive when exposed to x-ray radiation.

SUMMARY OF THE INVENTION

An object of the present disclosure is to provide a detector system having detectors with improved robustness with regard to x-ray sensitivity. A more particular object is to provide a detector system with edge-on detector modules with improved robustness with regard to x-ray sensitivity.

According to an aspect of the proposed technology there is provided a detector system for x-ray imaging. The detector system comprises a detector having a plurality of edge-on detector modules. Each of the edge-on detector modules comprises a first edge that is adapted to be oriented towards an x-ray source and a front-side running essentially parallel to the direction of incoming x-rays. The front-side comprises at least one charge collecting electrode. At least a subset of the plurality of edge-on detector modules being pairwise arranged, front-side to front-side, whereby a front-side to front-side gap is defined between the front-sides of the pairwise arranged edge-on detector modules. The pairwise arranged edge-on detector modules are associated with an anti-scatter collimator arranged in the x-ray path between the x-ray source and the edge-on detector modules and overlapping the front-side to front-side gap.

Embodiments of the proposed technology provide a detector system where the sensitive insulating layer provided on the detector module front-side is protected from damaging and deteriorating inflicted by direct impact from x-ray radiation. Particular embodiments of the proposed technology also provides a detector system which is insensitive to misalignment of detector modules and thus keeps a steady geometrical efficiency. Particular embodiments of the proposed technology also provides a mechanism to prevent artifacts from direct illumination on backsides or shadowing effects. The proposed technology also provides various detector system designs that enable improved charge collection.

DETAILED DESCRIPTION

Figure 7:
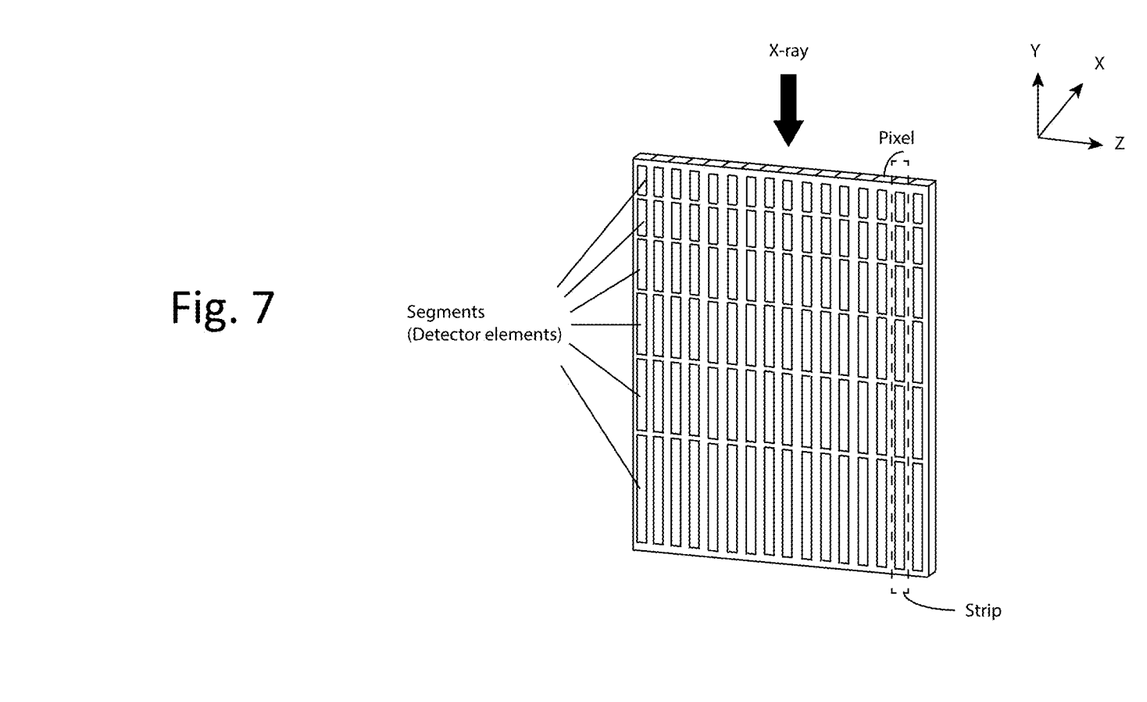
FIG. 7 is a schematic diagram illustrating an edge-on detector.
Figure 8:
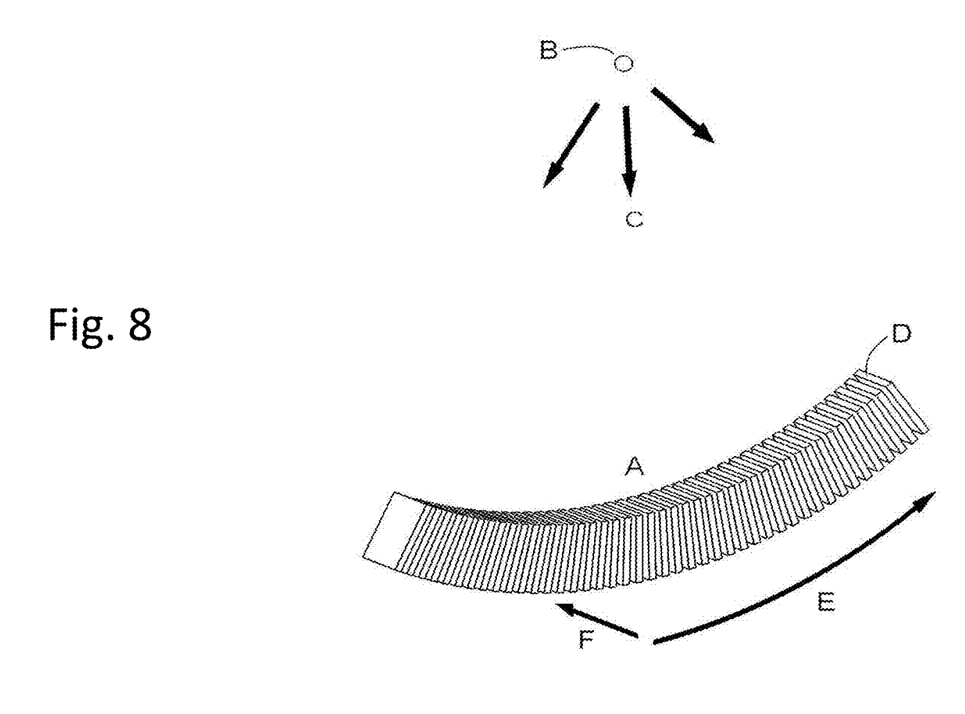
FIG. 8 is a schematic diagram of an x-ray detector system according to an exemplary embodiment.

FIG. 8 is a schematic diagram of an x-ray detector system according to an exemplary embodiment. In this example there is shown a schematic view of an X-ray detector with x-ray source B emitting x-rays C. The detector comprises a number of detector modules stacked side by side. The detector modules comprises an edge D pointing back towards the source, and they are preferably arranged in a slightly curved overall configuration. Two possible scanning motions (E, F) of the detector are indicated. In each scanning motion the source may be stationary or moving, in the scanning motion indicated by E the x-ray source and detector may be rotated around an object positioned in between. In the scanning motion indicated with F the detector and the source may be translated relative to the object, or the object may be moving. Also in scan motion E the object may be translated during the rotation, so called spiral scanning. By way of example, for CT implementations, the x-ray source and detector may be mounted in a gantry that rotates around the object or subject to be imaged. FIG. 7 provides an illustration of a particular edge-on detector in larger detail. It is illustrated how a front-side of a detector comprises a number of detector strips wherein each strip comprises a number of depth segments formed by charge collecting electrodes running in the direction of the incoming x-rays, in this particular geometry in the negative y-direction.

Figure 1:
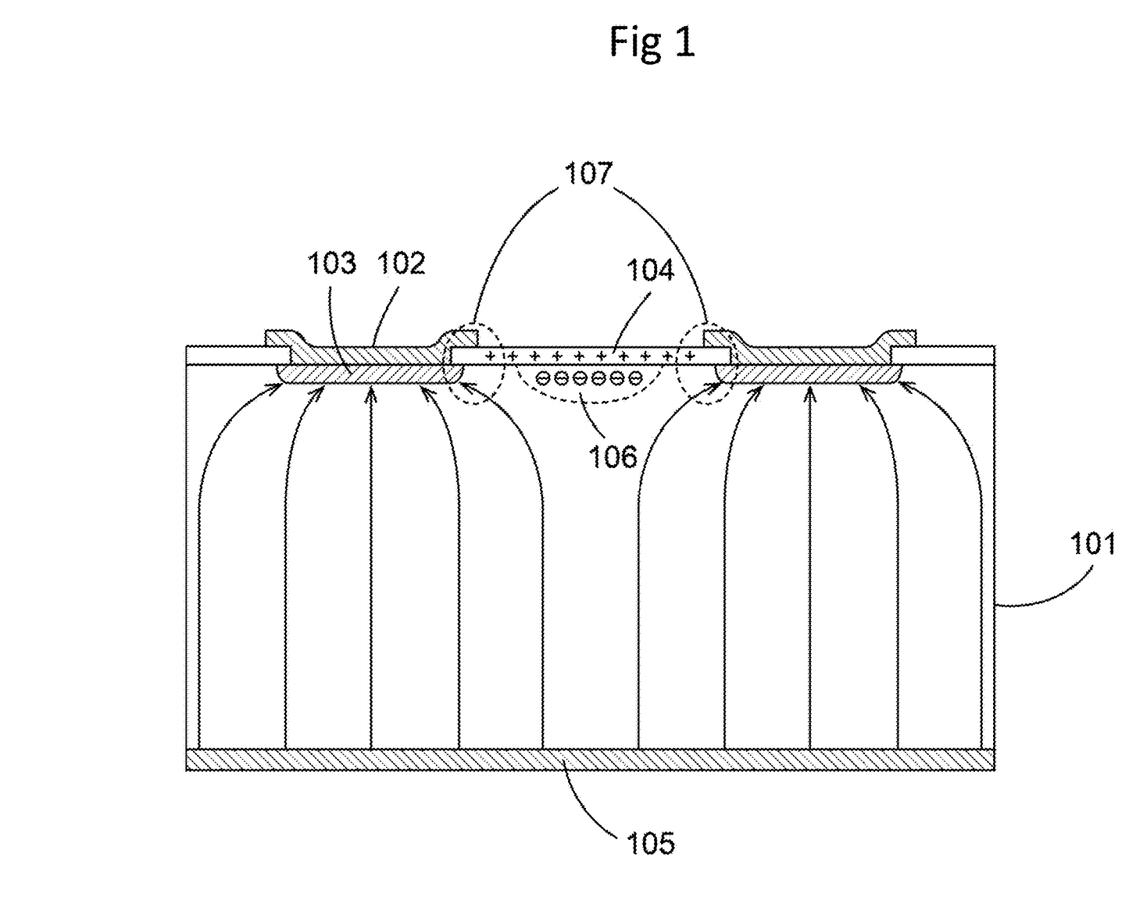
FIG. 1 is a schematic diagram of an example cross section of a silicon substrate.

FIG. 1 is a schematic diagram illustrating an example cross section of a semi-conductor substrate, e.g. a silicon substrate 101 with surface radiation damage. The metal contacts 102 of the charge collecting electrodes are deposited on top of P-plus implantation 103 of the corresponding electrodes. The oxide layer 104 on the front-side of a silicon detector is most sensitive to x-ray radiation, with fixed positive charge formed at the interface between silicon and silicon dioxide after long term x-ray radiation. Ideally, charge carriers released by each interacting photon will move along the field lines and then be collected by the corresponding charge collecting electrodes under the effect of an applied electric field by feeding a reverse bias to the backside metal contact 105 of the detector. However, an electron accumulation layer 106 formed below the interface between silicon and silicon dioxide prevents the full depletion of the sensor at the front-side surface, which results in weak electric field in this region and thus loss of charge carriers. A high electric field is also a consequence near the edge of charge collecting electrodes indicated by 107, leading to a reduction of break down voltage.

The detector modules illustrated in FIG. 8 comprises a semi-conducting material, such as silicon, that have a front-side and a back-side. The front-side, of which FIG. 1 provides an illustration, carries the electronic features of the detector. In particular embodiments routing traces connects the charge collecting electrodes with front-end electronics, and there are also embodiments that may also comprise optional features such as doped and un-doped regions as well as insulating regions. The insulating regions are highly sensitive to x-ray radiation and will be affected negatively if x-rays impinge directly on the front-sides.

It is an object of the proposed technology to provide a detector with improved robustness in so far that the front-side of the detector modules making up the detector are protected from the possibly deteriorating effects of impinging x-rays. That is, the proposed technology aims to provide a mechanism whereby x-ray sensitive front-sides of the detector modules are protected from damaging x-rays. The protective features of the proposed technology also provides for a detector system that enables improved charge collection.

A basic mechanism is to protect the front-side of edge-on detectors, such as silicon edge-on detectors by using an anti-scatter collimator which prevents high intensity direct x-ray beam from reaching the front-side volume of the detectors, thereby correspondingly reducing the risk of radiation damage. The anti-scatter collimator is needed for most x-ray medical imaging applications to reduce the amount of object scatter in order to e.g. increase the image quality. Furthermore, the present invention can help to keep a steady geometrical efficiency in case of misalignment of detector modules, which is another benefit. In what follows the detector system will be described by using a particular detector material in the form of silicon. This is however not an essential feature since the various embodiments to be described work equally well with any semi-conducting material. That is, the detector system according to the proposed technology may comprise detector modules of any suitable semi-conducting material.

Figure 2:
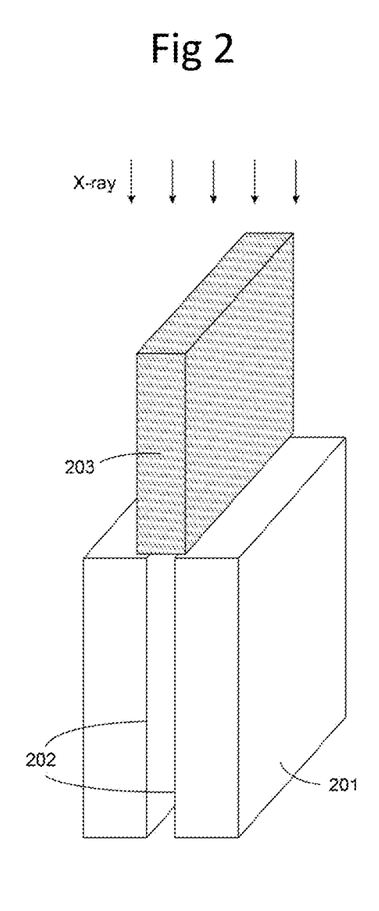
FIG. 2 is a perspective view of a pair of detector modules and how the front-side of the detectors are protected by the anti-scatter collimator.

To this end there is provided a detector system for x-ray imaging. Reference is made to FIG. 2 which illustrates schematically a detector system that comprises a detector having a plurality of edge-on detector modules 201. Each of the edge-on detector modules 201 comprises a first edge that is adapted to be oriented towards an x-ray source and a front-side 202 running essentially parallel to the direction of incoming x-rays. The front-sides 202 of the detector modules comprises at least one charge collecting electrode. At least a subset of the plurality of edge-on detector modules 201 making up the detector are pairwise arranged, front-side to front-side, whereby a front-side to front-side gap is defined between the front-sides of the pairwise arranged edge-on detector modules 201. The pairwise arranged edge-on detector modules 201 are associated with an anti-scatter collimator 203 arranged in the x-ray path between said x-ray source and said edge-on detector modules 201 and overlapping said front-side to front-side gap.

FIG. 2 provides a simplified diagram illustrating how a collimator 203 is arranged over the front-side to front-side gap defined by two adjacent detector modules 201. This particular arrangement provides protection to the front-sides 202 of the detectors. The fact that the collimator overlaps the gap also provides protection from x-rays that impinges on the detector at an angle. In greater detail there is shown a pair of detector modules 201 with front-side surfaces 202 facing each other and an anti-scatter collimator 203 positioned or arranged on top of the front-side surfaces of both detector modules. The anti-scatter collimator is made of high Z material which can efficiently absorb the direct x-ray beam and x-ray photons scattered by the object. The detector modules are arranged in edge-on configuration by orienting an edge of the detector modules towards incoming x-rays. In the present embodiment, the front-sides of the detector modules face each other, thus the anti-scatter collimator covers the front-side surface of both detector modules, which prevents the direct x-ray beam from reaching the front-side surfaces of the detector modules, and thus less surface damage.

As can be seen in e.g. FIG. 8, a detector according to the proposed technology may comprise a number of detector modules stacked side-by-side. The stacking of the modules should, according to the proposed technology, comprise at least a subset of detector modules that are pairwise arranged in such a manner that the front-side of a particular detector module faces the front-side of another detector module.

It is preferable if the anti-scatter collimator 203 comprises a collimator of a high Z material. Since the collimator is intended to absorb the impinging radiation the fact that there is a high Z material will ensure an efficient absorption and hence a reduced risk that high energy radiation impinges on the sensitive parts of the detector modules. That is, the sensitive parts arranged on the front-side of the detector modules.

A particular embodiment of the proposed technology provides a detector system wherein the front-side to front-side gap between adjacent detector modules comprises an anti-scatter foil. This optional feature will provide still further protection to the front-sides since the anti-scatter foil will provide a counter measure to possible residual radiation emanating from, e.g. the anti-scatter collimator 203. The anti-scatter foil may in a particular embodiment comprise a high Z material, such as tungsten.

Figure 3:
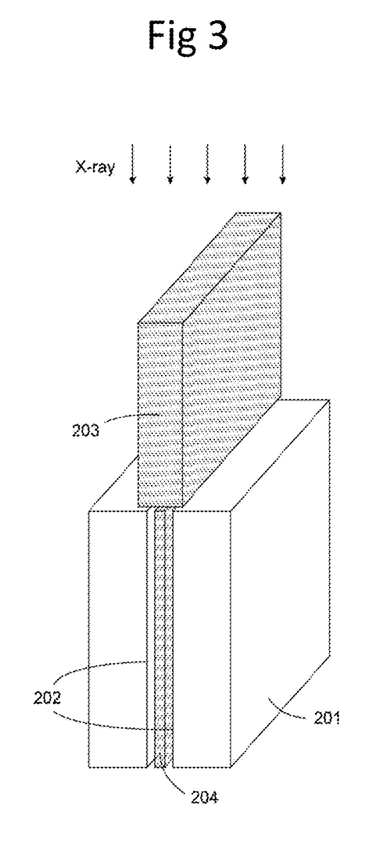
FIG. 3 is a perspective view of a pair of detector modules with an anti-scatter foil in between and how the front-side of the detectors are protected by the anti-scatter collimator.
Figure 4:
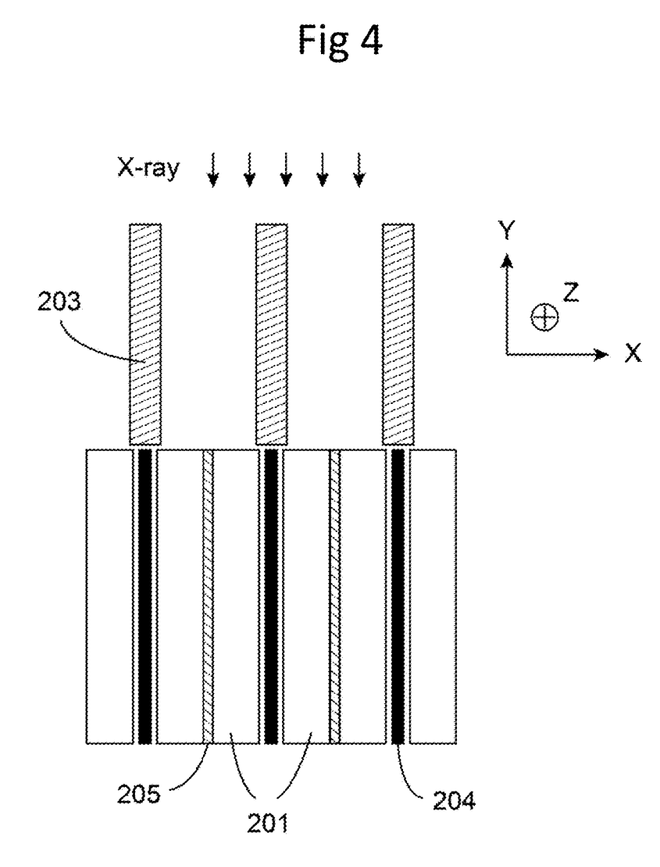
FIG. 4 is a schematic diagram illustrating three pairs of edge-on detector modules arranged front-side to front-side and being provided with anti-scatter collimators and anti-scatter foils according to a particular embodiment of the proposed technology.

FIG. 3 is a schematic diagram illustrating how a pair of detector modules 201 is provided with an anti-scatter foil 201 that is attached in between the front-sides of the detector modules. Also shown is an anti-scatter collimator 203 provided on top of the anti-scatter foil. The front-side surfaces of both detector modules are attached to the anti-scatter foil, thus the anti-scatter collimator covers both the anti-scatter foil and the front-side surfaces of the detector modules, which protects the front-side surfaces of the detector modules. FIG. 4 is in turn a schematic diagram illustrating how the silicon detector pairs as illustrated in FIG. 3 are positioned next to each other to form an array of detector modules.

Figure 5:
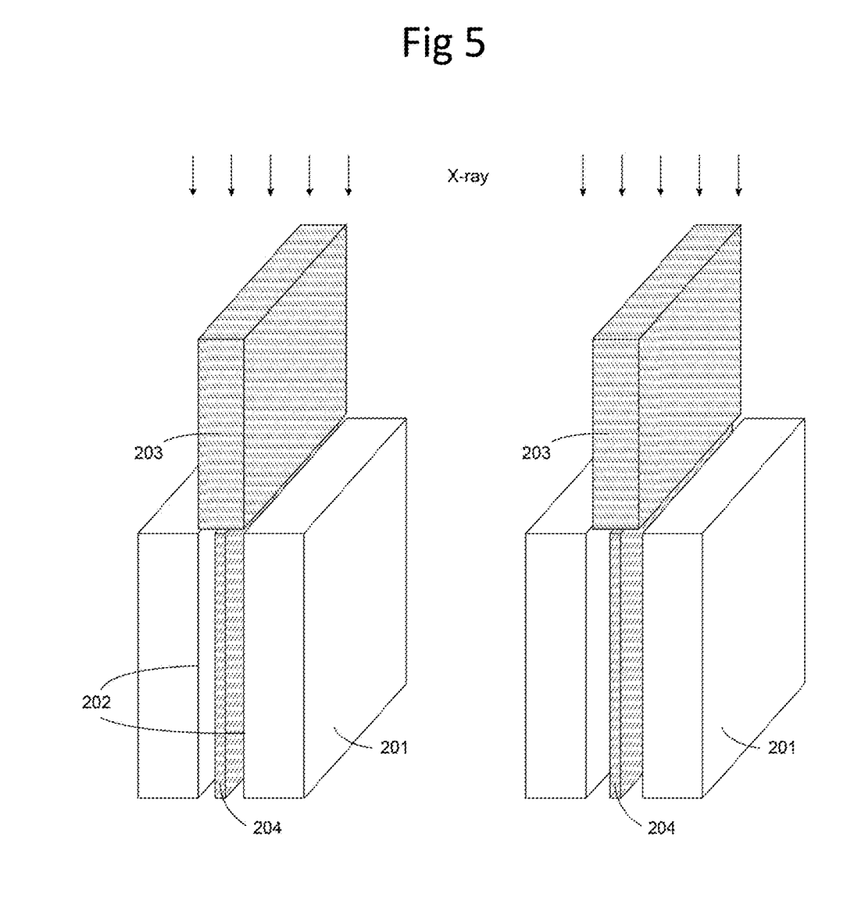
FIG. 5 is a schematic diagram illustrating different examples of what should be avoided when aligning the detector modules with the anti-scatter collimator.

In order to have the detector modules suffering from less radiation damage, the front-side surfaces should be covered by the anti-scatter collimator to prevent the direct x-ray beam from reaching the x-ray sensitive volume. One should avoid the cases illustrated in FIG. 5, with the front-side edge 202 of the silicon detector module either aligned with the edge of the anti-scatter collimator 203 or out of the coverage of the anti-scatter collimator. In both cases, the direct x-ray beam may impinge on the front-side surfaces of the detector modules, resulting in radiation damage. Therefore, the covered volume at the front-side surface should exceed 1% of the total detector volume to avoid the above two cases.

Figure 6:
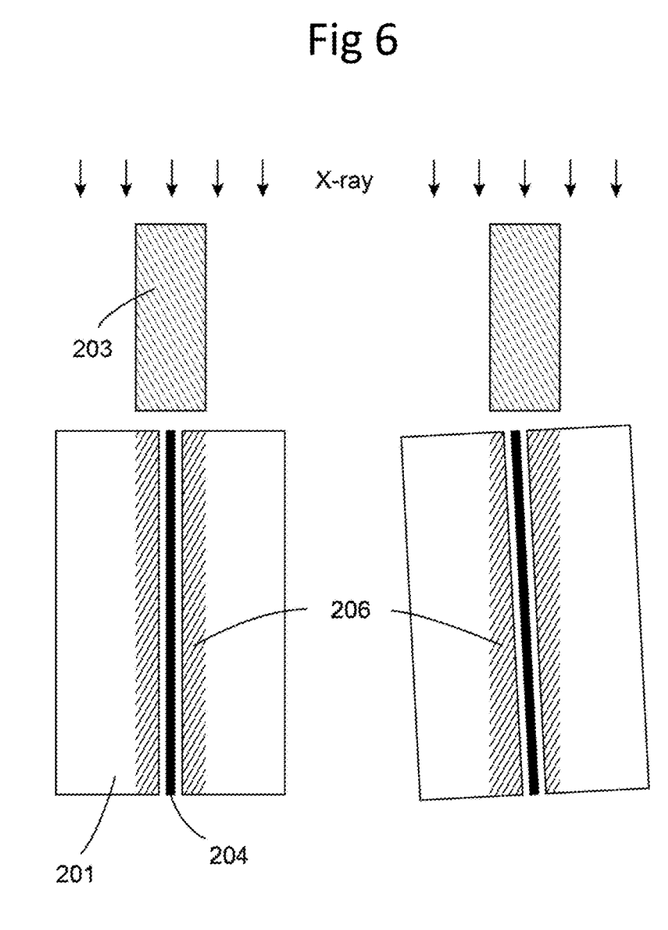
FIG. 6 is a schematic diagram illustrating the shadowing effect from anti-scatter collimator and how this can help to keep a steady geometrical efficiency in case of geometrical misalignment.

FIG. 6 is a schematic diagram illustrating how the above arrangement of anti-scatter collimator can help to keep a steady geometrical efficiency in case of geometrical misalignment of the detector modules. This example illustrates an edge-on configuration of the detector modules 201 with the anti-scatter collimator 203 covering both the front-sides of the detector modules and the anti-scatter foil 204. A volume of detector modules on the front-side becomes shadowed 206. Mechanical alignment may be a challenge for long detectors and geometrical misalignment may cause artifacts in images. As indicated in FIG. 6 of the present embodiment, there is almost no loss of geometrical efficiency caused by the geometrical misalignment of the detector modules.

Reference is now made to FIG. 4 which provides a schematic illustration of an array of detector modules where a number of detector modules are pairwise arranged so that their front-sides face each other. Each of the pairs is provided with an anti-scatter collimator arranged so as to overlap the gap between the front-sides of adjacent detector modules. In the drawing it is also illustrated an optional anti-scatter foil arranged in the space between the detector modules. The backside of a detector module arranged in the pairwise configuration shown will face the backside of another neighboring detector module. This will lead to a back-side to back-side gap 205 between adjacent detector modules. According to a particular embodiment of the proposed technology there is thus provided a detector system wherein the backside of at least one edge-on detector module 201 of the pairwise arranged edge-on detector modules 201 is arranged to face the backside of a corresponding edge-on detector module 201 in such a way that a back-side to back-side gap is formed between said edge-on detector module 201 and said corresponding edge-on detector module 201. The back-side to back-side gap defined by adjacent detector modules may according to a particular embodiment be provide with an attenuating material that is arranged to prevent direct x-ray irradiation on the backside of said edge-on detector modules 201 or shadowing effects.

A particular purpose with the attenuating material provided in the gap is to make the detected number of x-ray counts less sensitive to geometrical misalignment. The narrow gap may to this end be filled with an attenuator, such as silicone, which holds a similar attenuation characteristic as silicon. In case of misalignment, the attenuator provided between the detector modules will prohibit direct illumination on the detector side and make the detected spectrum close to that which has travelled through the silicon bulk.

Another beneficial feature achieved is that the attenuating material may reduce the amount of x-ray radiation that penetrates the backside of the edge-on detector modules 201. To this end a high Z material such as tungsten could be used, those materials may however lead to shadowing which will negatively affect the efficiency of the detector, a mere air-filled gap would in turn result in direct illumination on the backsides which will also lead to a negative impact on the detector system. To this end the inventors have realized that a preferred material should have similar attenuation characteristics as the semi-conductor material used in the detector, e.g. silicon. A particular example that may be used in the case the detector modules comprises silicon is silicone, which contains silicon. Silicone has similar attenuating features as silicon and this combination forms a particular suitable embodiment. Many other combinations or detector materials and attenuating materials are however possible. The main purpose being that the attenuating material have similar attenuation characteristics as the material used as the detector material.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

M. Danielsson, et al., "Dose-efficient system for digital mammography", Proc. SPIE, Physics of Medical Imaging, vol. 3977, pp. 239-249 San Diego, 2000

U.S. Pat. No. 8,183,535 B2 Mats Danielsson et al. "Silicon detector assembly for x-ray imaging"

Cheng Xu et al.: "Energy resolution of a segmented silicon strip detector for photon-counting spectral CT" Nuclear Instruments and Methods in Physics Research 715201311-17

Xuejin Liu et al.: "Spectral response model for a multibin photon-counting spectral computed tomography detector and its applications" Journal of Medical Imaging 23 2015 033502

US2004/0251419 A1 Nelson et al. "Device and system for enhanced SPECT, PET, and Compton scatter imaging in nuclear medicine"

J. Zhang, "X-Ray Radiation Damage Studies and Design of a Silicon Pixel Sensor for Science at the XFEL", Doctoral Thesis, University of Hamburg, DESY-THESIS-2013-018 2013.

J. Schwandt, "Design of a Radiation Hard Silicon Pixel Sensor for X-ray Science", Doctoral Thesis, Hamburg University, DESY-THESIS-2014-029 2014.

The invention claimed is:

1. A detector system for x-ray imaging, said detector system comprising:
   a detector having a plurality of adjacent edge-on detector modules, wherein:
      each of said edge-on detector modules comprises a first edge that is adapted to be oriented towards an x-ray source and a front-side running essentially parallel to the direction of incoming x-rays, said front-side comprising at least one charge collecting electrode and routing traces connecting the at least one charge collecting electrode with front-end electronics; and
      at least a subset of said plurality of adjacent edge-on detector modules being pairwise arranged, front-side to front-side, whereby a front-side to front-side gap is defined between the front-sides of said pairwise arranged edge-on detector modules; and wherein
      each said pairwise arranged edge-on detector modules include an anti-scatter collimator arranged in the x-ray path between said x-ray source and said edge-on detector modules and overlapping said front-side to front-side gap, said anti-scatter collimator being arranged to protect the front-side surface of both detector modules in each said pairwise arranged edge-on detector module from damaging x-rays, and
      each pair of said pairwise arranged edge-on detector modules further include an anti-scatter foil located in said front-side to front-side gap between the front-sides of said pairwise arranged edge-on detector modules.

2. The detector system according to claim 1, wherein said anti-scatter collimator comprises a collimator of a high Z material.

3. The detector system according to claim 2, wherein said front-side to front-side gap comprises an anti-scatter foil.

4. The detector system according to claim 2, wherein said anti-scatter foil comprises a high Z anti-scatter foil.

5. The detector system according to claim 2, wherein the backside of at least one edge-on detector module of said pairwise arranged edge-on detector modules is arranged to face the backside of a corresponding edge-on detector module in such a way that a back-side to back-side gap is formed between said edge-on detector module and said corresponding edge-on detector module.

6. The detector system according to claim 1, wherein said anti-scatter foil is attached to the front-side surfaces of both edge-on detector modules of each pair of said pairwise arranged edge-on detector modules.

7. The detector system according to claim 6, wherein said anti-scatter foil comprises a high Z anti-scatter foil.

8. The detector system according to claim 1, wherein said anti-scatter foil comprises a high Z anti-scatter foil.

9. The detector system according to claim 1, wherein the front side volume protected by said anti-scatter collimator exceeds 1% of the total detector volume.

10. The detector system according to claim 1, wherein the backside of at least one edge-on detector module of said pairwise arranged edge-on detector modules is arranged to face the backside of a corresponding edge-on detector module in such a way that a back-side to back-side gap is formed between said edge-on detector module and said corresponding edge-on detector module.

11. The detector system according to claim 10, wherein said back-side to back-side gap comprises an attenuating material.

12. The detector system according to claim 11, wherein said attenuating material comprises a material having similar attenuation characteristics as the semi-conducting material used for the detector modules.

13. The detector system according to claim 1, wherein said edge-on detector modules comprises edge-on detector modules of a semi-conducting material.

14. The detector system according to claim 13, wherein said semi-conducting material comprises silicon.

15. The detector system according to claim 14, wherein said attenuating material comprises silicone.

16. The detector system according to claim 1, wherein the detector system is arranged to provide improved charge collection.

17. The detector system according to claim 1, wherein,
   each said anti-scatter collimator has a front face portion arranged facing the directly incoming x-rays and a rear face portion facing front sides of the pairwise arranged edge-on detector modules and the said front-side to front-side gap therebetween,
   a width of the rear face portion being greater than a width of said front-side to front-side gap adjacent said rear face portion, the rear face portion covering both said front-side to front-side gap and a portion of front sides of each of the pairwise arranged edge-on detector modules, the rear face portion thereby covering and protecting the front side volume of the pairwise arranged edge-on detector modules against the directly incoming x-rays.

* * * * *